United States Patent

Uchino et al.

Patent Number: 5,233,575
Date of Patent: Aug. 3, 1993

[54] MAGNETO-OPTICAL RECORDING MEDIUM

[75] Inventors: Kenichi Uchino, Tama; Toshifumi Kawano, Yokohama, both of Japan

[73] Assignee: Mitsubishi Kasei Corporation, Tokyo, Japan

[21] Appl. No.: 720,438

[22] Filed: Jul. 26, 1991

[30] Foreign Application Priority Data

Nov. 10, 1989 [JP] Japan .................. 1-292897

[51] Int. Cl.⁵ .......... G11B 11/00; G11B 5/66
[52] U.S. Cl. .................. 369/13; 428/694; 360/135
[58] Field of Search .......... 369/13, 288; 360/131, 360/59, 135, 134; 428/694, 212, 900; 365/122, 123; 430/945

[56] References Cited

U.S. PATENT DOCUMENTS

| | | | |
|---|---|---|---|
| 4,842,956 | 6/1989 | Kobayashi | 428/611 |
| 4,956,243 | 9/1990 | Miyake et al. | 369/13 X |
| 5,016,232 | 5/1991 | Tadokoro et al. | 369/13 |

FOREIGN PATENT DOCUMENTS

| | | |
|---|---|---|
| 331737 | of 0000 | European Pat. Off. . |
| 58-73017 | 5/1983 | Japan . |
| 63-239637 | 10/1988 | Japan . |
| 1-118251 | 5/1989 | Japan . |
| 2201756 | 8/1990 | Japan . |
| 2234623A | of 0000 | United Kingdom . |

OTHER PUBLICATIONS

Vol. 25, No. 5, Oct. 1989, Y. Yoneyama et al. 'Effect of the thermal interference in the thermomangetically recorded domains'.

*Primary Examiner*—Robert J. Pascal
*Assistant Examiner*—Ali Neyzari
*Attorney, Agent, or Firm*—Oblon, Spivak, McClelland, Maier & Neustadt

[57] ABSTRACT

A magneto-optical recording medium capable of overwriting which comprises a substrate, a magneto-optical recording layer provided on the substrate, a recording auxiliary layer provided on the substrate, a recording auxiliary layer provided on the magneto-optical recording layer and a heat sink layer provided on the side of the recording auxiliary layer.

8 Claims, 1 Drawing Sheet ized. Upon $P_H$ irradiation,
MAGNETO-OPTICAL RECORDING MEDIUM

TECHNICAL FIELD

The present invention relates to a magneto-optical recording medium capable of optical recording.

BACKGROUND ART

Magneto-optical recording media have been becoming, put to practical use as high-density, low-cost rewritable information recording media.

Particularly, those magneto-optical recording media having a recording layer comprising an amorphous alloy of a rare earth metal and a transition metal exhibit very excellent characteristics.

A major drawback of magneto-optical recording media left to overcome is that the media are not capable of overwriting (overwrite recording). That is, the conventional magneto-optical recording media require an erasing process before recording, and, accordingly, one recording operation requires two rotating operations, thereby lowering the rate of data transfer.

In recent years, a number of overwriting methods for magneto-optical recording media have been proposed.

A promising one of the methods proposed is an optical modulation overwriting method in which a multi-layer film is utilized. This system, as is discussed in the Abstracts of Papers for the 34th Oyo-Butsurigaku Kankei Rengo Koenkai, 28P.ZL-3, P721 (1987), comprises a perpendicular magnetization layer (recording layer) having a low Curie temperature and a high coercive force and a perpendicular magnetization layer (auxiliary layer) having a relatively higher Curie temperature and a lower coercive force. Overwriting is carried out by first applying a magnetic field (initializing magnetic field) having sufficient intensity for aligning the magnetization directions in the auxiliary layer but having no influence on the recording layer, and then irradiating with a beam of light modulated to have two values of power, a high power ($P_H$) and a low power ($P_L$), while applying a bias magnetic field.

Upon $P_L$ irradiation, inversion of the magnetization direction does not occur in the auxiliary layer, and the magnetization directions in the recording layer are oriented in a stabilizing direction through switched connection with the auxiliary layer. Upon $P_H$ irradiation, the auxiliary layer undergoes inversion of magnetization directions by a bias magnetic field, and as a result thereof, the recording layer is accordingly oriented oppositely to the case of $P_L$ irradiation, whereby overwriting can be achieved.

One of the problems involved in this system is that the recording medium must be designed by considering a sufficient power difference between the $P_L$ and the $P_H$. If the difference is insufficient, high-power recording may take place at a high-temperature portion in the center of a beam spot when $P_L$ recording is carried out. This arises from the temperature distribution in the beam spot, and becomes more conspicuous when a more intense bias magnetic field is applied.

In addition, diffusion of heat from a $P_H$ region causes a heat gradient in a $P_L$ region, resulting in a reduced power margin for $P_L$. By the "power margin" herein is meant a power range in which sufficient C/N ratio and erasing ratio can be obtained over the entire frequency range of the recording signals.

The requirement for a sufficient difference between $P_L$ and $P_H$ means that the $P_H$ should not be lowered, i.e., a high-power laser is required.

For high-speed rotation of a disk, on the other hand, the $P_H$ should be lowered in view of laser power limitations, and it is desirable to use an auxiliary layer having a low $H_{C2}$, which has been impossible due to the above-mentioned problems.

SUMMARY OF THE INVENTION

The present inventors made studies on the above-mentioned problems and, as a result of the studies, have found out that recording with a low $P_H$ can be carried out by use of a magneto-optical recording medium provided with a heat sink layer.

The present invention relates to a magneto-optical recording medium capable of overwriting which comprises a magneto-optical recording layer having a Curie temperature of $T_{C1}$ and a coercive force at room temperature of $H_{C1}$, a recording auxiliary layer having a Curie temperature of $T_{C2}$ and a coercive force at room temperature of $H_{C2}$, the magneto-optical recording layer and the recording auxiliary layer being provided in this order on a substrate, and the values $T_{C1}$, $T_{C2}$, $H_{C1}$ and $H_{C2}$ satisfying the following relationships:

$$T_{C1} < T_{C2}$$

$$H_{C1} > H_{C2}$$

and a heat sink layer which comprises a material having a thermal conductivity higher than the thermal conductivity of the recording auxiliary layer and is provided on the recording auxiliary layer on a side opposite to the side facing the substrate.

The present invention will now be explained in detail below.

DETAILED DESCRIPTION OF THE PREFERRED EMBODIMENTS

Figure 1:
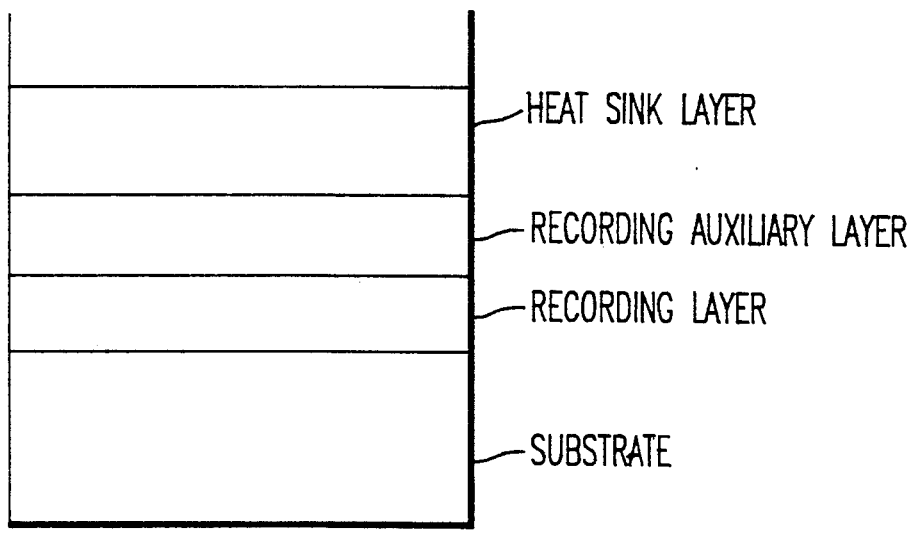
FIG. 1 shows a side view of a recording media of the invention.

FIG. 1 shows an embodiment of the invention comprising substrate, magneto-optic recording layer, auxiliary layer, and heat sink layer, stacked upon one another. A protective layer is on top of heat sink layer.

The substrate for use in the present invention may include a transparent substrate of a glass or of a plastic such as acrylic resin, polycarbonate resin, etc.

The thickness of the substrate is generally about 1.2 mm.

In the present invention, a magneto-optical recording layer and a recording auxiliary layer are provided on the substrate.

For the recording layer, there is preferably used a material having a low Curie Temperature $T_{C1}$ and a high coercive force (as measured by VSM) $H_{C1}$, particularly an amorphous alloy of a rare earth metal and a transition metal. Examples of the material may include TbFe, TbFeCo, DyFe, DyFeCo, TbDyFeCo, etc. $T_{C1}$ is preferably from 120° to 200° C., whereas $H_{C1}$ is preferably not less than 10 kOe. The thickness of the recording layer is preferably about 300 to 1000 Å. The thermal conductivity of the recording layer is generally from 15 to 20 $Wm^{-1}K^{-1}$.

The auxiliary layer comprises a magnetic layer comprising an amorphous alloy of a rare earth metal and a transition metal, like the recording layer, but a material having a high Curie temperature $T_{C2}$ and a low coercive force $H_{C2}$ is used for the auxiliary layer. Examples of such a material are TbFeCo, DyFeCo, DyCo, TbDyFeCo, TbCo, GdDyFe, GdDyFeCo, GdTbFe, GdTbFeCo, etc. $T_{C2}$ is preferably from 180° to 250° C., and, of course, should be higher than $T_{C1}$. As for $H_{C2}$, a lower value is preferred for reducing an initializing magnetic field ($H_{ini}$). However, the auxiliary layer is subjected to an effective bias magnetic field (Hw) due to switched connection with the recording layer, and therefore, the condition:

$$H_{C2} > Hw$$

must be satisfied in order to stabilize an initialized state of the auxiliary layer. In general, $H_{C2}$ is preferably about 1 to 3 kOe.

Ordinarily, the thermal conductivity of the auxiliary layer is nearly the same as the thermal conductivity of the recording layer.

The thickness of the auxiliary layer is from 500 to 2500 Å, preferably from 600 to 1500 Å. It is preferred that the thickness of the auxiliary layer is from 1.0 to 3.0 times the thickness of the recording layer, preferably from 1.2 to 2.5 times the thickness of the recording layer. Where an intermediate layer, which will be described later, is provided, it is preferred that the thickness of the auxiliary layer is about 1.0 to 2 times the thickness of the recording layer.

An intermediate layer for control of magnetic wall energy may be provided between the recording layer and the auxiliary layer. For the intermediate layer, a magnetic material such as GdFeCo, FeCo, etc., or a dielectric material such as a nitride of a metal, etc., an oxide of a metal, etc., is used. It is preferable that the intermediate layer has a perpendicular magnetic anisotropy lower than that of the recording layer and the auxiliary layer, and the thickness of the intermediate layer is preferably about 30 to 100 Å. The intermediate layer may be formed, after formation of the recording layer, by treating the surface of the recording layer with $N_2$ or $O_2$.

In the present invention, a heat sink layer is provided on the auxiliary layer. The object of the heat sink layer is to diffuse the heat generated by a recording beam, thereby reducing the heat distribution in the beam spot. The presence of the heat sink layer can avoid the phenomenon of the center of a beam spot brought into the $P_H$ state at the time of $P_L$ recording. Therefore, the heat sink layer makes it possible to use a medium having a small difference between $T_{C1}$ and $T_{C2}$ and, accordingly, $P_H$ can be lowered. When the heat sink layer is provided, furthermore, the heat generated by $P_H$ recording can be diffused, so that the influence of the heat on $P_L$ recording is reduced, and a wider power margin for $P_L$ can be realized.

For the heat sink layer, for instance, a metal having a thermal conductivity higher than that of the auxiliary layer, such as Au, Ag, Cu and Al, or an alloy of these metal and an additive metal such as Ta, Ti, Mg, Si, Pt, etc. can be used preferably. Among these, Al or an Al-based alloy is preferred. The thermal conductivity of the heat sink layer is preferably at least two times the thermal conductivity of the recording auxiliary layer, more preferably from 40 to 300 $Wm^{-1}K^{-1}$.

The thickness of the heat sink layer is from 100 to 2000 Å, preferably from 200 to 1000 Å. Where the heat sink layer is comprises Al, the thickness is preferably from 100 to 500 Å, more preferably from 200 to 500 Å.

As higher the thermal conductivity of the heat sink layer and greater the thickness, the heat sink layer is more effective for enlarging the power margin but, at the same time, becomes poorer in sensitivity. Therefore, it is preferred that the thermal conductivity and the thickness of the heat sink layer satisfy the relationship:

$$1.6 \times 10^{-6} < k \times d < 1.2 \times 10^{-5},$$

preferably, $$2.4 \times 10^{-6} < k \times d < 7.2 \times 10^{-6}$$

wherein k is the thermal conductivity ($Wm^{-1-1}$) of the heat sink layer, d is the thickness (m) of the heat sink layer and the term $k \times d$ represents the quantity of heat transferred through the heat sink layer in unit time.

An interference layer may be provided between the substrate and the recording layer. The interference layer is a layer for lowering the reflection of incident light, thereby increasing sensitivity and C/N ratio. The interference layer is provided by use of a transparent dielectric material with a high refractive index, for instance, $Si_3N_4$, AlN, $Ta_2O_5$, $TiO_2$ or ZnS.

A protective layer may be provided on the heat sink layer. For the protective layer, a stable dielectric material such as $Si_3N_4$, AlN, $Ta_2O_5$, $Al_2O_3$, $TiO_2$, etc. is preferably used.

Each of the above layers is provided on the substrate by a physical vapor deposition (PVD) process such as sputtering, or a chemical vapor deposition (CVD) process such as plasma CVD.

Formation of the magneto-optical recording layer, the auxiliary layer, the heat sink layer and the protective layer by the PVD process is generally carried out by using a target having a predetermined composition to deposit each of the layers on the substrate by electron beam vapor deposition or sputtering. Also, use of ion plating may be contemplated.

When the deposition rate of a film is too high, stress of the film is increased, whereas too low a deposition rate has an adverse effect on productivity. Thus, the deposition rate is usually about 0.1 to 100 Å/sec.

BEST MODE FOR CARRYING OUT THE INVENTION

The present invention will now be explained more in detail with reference to the following examples. It is to be understood, however, that the present invention is not limited by the examples, unless beyond the scope of the invention.

EXAMPLE 1

A polycarbonate substrate 130 mm in diameter was introduced into a sputtering device having two film-forming chambers. The chamber with the substrate placed therein was first evacuated to a reduced pressure of below $3 \times 10^{-7}$ Torr. Then, reactive sputtering was carried out by use of a mixed gas of Ar and $O_2$ and a Ta target, to form an 800 Å thick interference layer of $Ta_2O_5$.

After the substrate was moved into the other chamber evacuated to a vacuum degree of below $2 \times 10^{-7}$ Torr, Ar was introduced at a rate of 100 sccm under a pressure of 4 mTorr. Sputtering was carried out by using simultaneously Tb and $Fe_{95}Co_5$ (atom %, the same shall apply hereinbelow) as targets, to form a 500 Å thick recording layer having a composition of $Tb_{19}(Fe_{95}Co_5)_{81}$ (a Curie temperature of 175° C., a coercive force at room temperature of above 15 kOe, and a thermal conductivity of 18 $Wm^{-1}K^{-1}$). Subsequently, sputtering was carried out by using simultaneously Dy and $Fe_{70}Co_{30}$ as targets, to form a 1500 Å thick auxiliary layer having a composition of $Dy_{30}(Fe_{70}Co_{30})_{70}$ (a Curie temperature of 230° C., a coercive force at room temperature of 2.2 kOe, and a thermal conductivity of 16 $Wm^{-1}K^{-1}$).

The substrate was moved into the first chamber, and a 500 Å thick heat sink layer (thermal conductivity: 240 $Wm^{-1}K^{-1}$) was formed by use of an Al target. The characteristics of the disk thus obtained were examined. The results are shown in Table 1. The measurements were carried out under the conditions of an initializing magnetic field ($H_{ini}$) of 6 kOe, a recording magnetic field ($H_b$) of 300 Oe, a recording frequency of 7.4 MHz, a rotational speed of 3600 rpm, a recording pulse width (Tw) of 60 nS, and a measuring position (R: the distance from the center of the disk) of 30 mm, to determine each power value ($P_L$, $P_H$) at which a maximum C/N ratio was attained.

EXAMPLE 2

The procedure up to the formation of the auxiliary layer was repeated in the same manner as in Example 1, and then a 300 Å thick $Ta_2O_5$ layer was formed as a dielectric layer in a manner similar to the formation of the interference layer. Then, a 500 Å thick Al heat sink layer (thermal conductivity: 240 $Wm^{-1}K^{-1}$) was formed. The $Ta_2O_5$ layer has the function of controlling the rate of heat conduction to the heat sink layer. The characteristics of the disk thus obtained are shown in Table 1.

COMPARATIVE EXAMPLE 1

The procedure up to the formation of the auxiliary layer was repeated in the same manner as in Example 1. No heat sink layer was formed, but an 800 Å thick protective layer of $Ta_2O_5$ having a thermal conductivity lower than that of the auxiliary layer was formed for the purpose of preventing oxidation. The characteristics of the disk thus obtained are shown in Table 1.

COMPARATIVE EXAMPLE 2

A disk was produced in the same manner as in Example 1 except that a 1500 Å thick $Tb_{32}(Fe_{70}Co_{30})_{68}$ layer having a Curie temperature of 275° C., a coercive force at room temperature of 2.0 kOe, and a thermal conductivity of 18 $Wm^{-1}K^{-1}$ was used as an auxiliary layer. The characteristics of the disk thus obtained are shown in Table 1.

TABLE 1

|  | $H_{C1}$ (kOe) | $H_{C2}$ (kOe) | $P_L$ (mW) | $P_H$ (mW) | C/N (dB) |
|---|---|---|---|---|---|
| Example 1 | >15 | 2.2 | 5.0 | 9.5 | 47.8 |
| Example 2 | >15 | 2.3 | 4.5 | 8.5 | 47.0 |
| Comparative Example 1 | >15 | 2.0 | 3.5 | 7.5 | 40.3 |
| Comparative Example 2 | >15 | 2.0 | 4.5 | 11.5 | 47.2 |

As shown in Table 1, where the auxiliary layer was used, all the above disks except the disk of Comparative Example 2 were capable of recording with $P_H$ of less than 10 mW for R=30 mm, even at a rotational speed of 3600 rpm. However, the disk of Comparative Example 1 showed an excessively high temperature at a central portion of the beam spot in $P_L$ recording, and as a result, the C/N ratio is low. Further, the disk of Comparative Example 2 required a $P_H$ power of more than 11 mW.

In contrast to the above, the disks of the Examples 1 and 2 gave satisfactory C/N ratios for practical use at low $P_H$ values.

COMPARATIVE EXAMPLE 3 and EXAMPLES 3(a)–3(d)

The procedure up to the formation of the auxiliary layer was repeated in the same manner as in Example 1, and then a $Ta_2O_5$ layer (300 Å thick) was formed as a protective layer to obtain a magneto-optical disk (Comparative Example 3).

After the disk thus obtained was subjected to measurements of characteristics, the disk was again introduced into the sputtering device to form a 100 Å thick Al layer on the protective layer, followed by measurements of characteristics (Example 3(a)).

Magneto-optical disks were obtained and measurements were carried out in the same manner as above, except that the thickness of the Al layer was changed to 300 Å (Example 3(b)), 500 Å (Example 3(c)) and 1000 Å (Example 3(d)), respectively.

The results are shown in Table 2.

TABLE 2

|  | Heat sink layer (Al layer) | | $P_L$ (mW) | $P_H$ (mW) |
|---|---|---|---|---|
|  | Thickness | Thermal conductivity ($Wm^{-1}K^{-1}$) | | |
| Comparative Example 3 | 0 | — | — | — |
| Example 3(a) | 100 Å | 240 | 3.2~3.6 | >8.0 |
| Example 3(b) | 300 Å | 240 | 3.6~4.6 | >9 |
| Example 3(c) | 500 Å | 240 | 3.4~5.0 | >9.5 |
| Example 3(d) | 1000 Å | 240 | 3.8~6.6 | >10.5 |

Measuring conditions:
R=30 mm, 1800 rpm, f (recording frequency)=1.4 MHz and 3.7 MHz, Tw (recording pulse width)=90 nS, $H_{ini}$=6 kOe, $H_b$=100 Oe.

$P_H$ and $P_L$:
Power values at which both the requirements, C/N ratio of 45 dB or above and the ΔC/N of 20 dB or below, are satisfied at both recording frequencies of 1.4 MHz and 3.7 MHz.

ΔC/N represents the residual amount of the original signal when recording was made at 1.4 MHz and overwriting at 3.7 MHz, and when recording was made at 3.7 MHz and overwriting at 1.4 MHz.

In Comparative Example 3, although C/N ratio of more than 45 dB were obtained, the $P_L$ for obtaining a high C/N ratio at 1.4 MHz was deviated from that at 3.7 MHz, and there was no $P_L$ value at which both the requirements, the C/N ratio of 45 dB or above and the ΔC/N of 20 dB or below, were fulfilled at both frequencies. On the other hand, in each of Examples 3(a) to 3(d), there was $P_L$ range in which both the requirements, the C/N ratio of 45 dB or above and the ΔC/N of 20 dB or below, were fulfilled. Especially where the thickness of the heat sink layer (Al layer) is large, a wide margin can be obtained. For instance, Example 3(d) gave a margin of from 3.8 to 6.6 mW.

EXAMPLE 4

The procedure up to the formation of the $Ta_2O_5$ protective layer was repeated in the same manner as in Example 3, and then a 1000 Å thick heat sink layer of $Al_{97}Ta_3$ was formed on the protective layer to obtain a magneto-optical disk. The thermal conductivity of the heat sink layer was 55 $Wm^{-1}K^{-1}$. When the disk was subjected to measurements under the same conditions as in Example 3, the $P_H$ and $P_L$ values fulfilling both the requirements, the C/N ratio of 45 dB or above and the $\Delta$C/N of 20 dB or below, were 9 mW and 3.4–4.2 mW, respectively.

Industrial Applicability

According to the present invention, an overwritable magneto-optical recording medium having a high sensitivity and a high C/N can be obtained.

We claim:

1. A magneto-optical recording medium capable of overwriting which comprises:
   a substrate,
   a magneto-optical recording layer provided on the substrate,
   a recording auxiliary layer provided on the magneto-optical recording layer;
   a heat sink layer provided on the recording auxiliary layer; and
   wherein the magneto-optical recording layer has a Curie temperature of $T_{C1}$ and a coercive force at room temperature of $H_{C1}$, the recording auxiliary layer has a Curie temperature of $T_{C2}$ and a coercive force at room temperature of $H_{C2}$, the values $T_{C1}$, $T_{C2}$, $H_{C1}$ and $H_{C2}$ satisfying the following relations:

$$T_{C1} < T_{C2}$$

$$H_{C1} > H_{C2}$$

and the heat sink layer has a thermal conductivity higher than the thermal conductivity of the recording auxiliary layer.

2. A magneto-optical recording medium according to claim 1, wherein the heat sink layer comprises Al or an Al-based alloy.

3. A magneto-optical recording medium according to claim 1, wherein the thermal conductivity of the heat sink layer is at least twice as large as the thermal conductivity of either of the recording layer and the recording auxiliary layer.

4. A magneto-optical recording medium according to claim 1, wherein the thermal conductivity of the heat sink layer is in the range from 40 to 300 $Wm^{-1}K^{-1}$.

5. A magneto-optical recording medium according to claim 1, wherein the recording layer comprises a amorphous alloy of a rare earth metal and a transition metal, the alloy being easy to magnetize perpendicularly.

6. A magneto-optical recording medium according to claim 1, wherein the heat sink layer satisfies the following expression:

$$1.6 \times 10^{-6} k \times d < 1.2 \times 10^{-5},$$

wherein k is the thermal conductivity ($Wm^{-1}K^{-1}$) of the heat sink layer and d is the thickness (m) of the heat sink layer.

7. A process for overwrite recording of a magneto-optical recording medium, comprising the steps of:
   forming the recording medium by sequentially depositing a first magnetic layer, a second magnetic layer, and a heat sink layer on a substrate, wherein the first magnetic layer is characterized by $H_{C1}$, $T_{C1}$, the second magnetic layer is characterized by $H_{C2}$, $T_{C2}$, $T_{C1} < T_{C2}$ and $H_{C1} > H_{C2}$, and the heat sink layer has a higher thermal conductivity than the second magnetic layer;
   moving the magnetic media relative to a light beam source;
   applying an initializing magnetic field ($H_{imi}$) higher than $H_{C2}$ to the recording medium to align the perpendicular magnetization of the second magnetic layer into the same direction as the first magnetic layer, and
   irradiating the recording medium with a light beam from the light beam source while modulating the light beam between two values of power, a high power ($P_H$) and a lower power ($P_L$), while applying a bias magnetic field to the recording medium.

8. A process for overwrite recording for a magneto-optical recording medium comprising a substrate, a first magnetic layer above the substrate, a second magnetic layer above the first magnetic layer, an a heat sink layer above the second magnetic layer, wherein the first magnetic layer is characterized by $H_{C1}$, $T_{C1}$, the second magnetic layer is characterized by $H_{C2}$, $T_{C2}$, $T_{C1} < T_{C2}$ and $H_{C1} > H_{C2}$, and the heat sink layer has a higher thermal conductivity than the second magnetic layer, comprising the steps of:
   moving the magnetic media relative to a first light beam source;
   applying an initializing magnetic field ($H_{ini}$) higher than $H_{C2}$ to the recording medium to align the perpendicular magnetization of the second magnetic layer into the same direction as the first magnetic layer, and
   simultaneously irradiating the recording medium with a light beam from the light beam source while modulating the light beam between two values of power, a high power ($P_H$) and a lower power ($P_L$), and applying a bias magnetic field to the recording medium.

* * * * *

UNITED STATES PATENT AND TRADEMARK OFFICE
CERTIFICATE OF CORRECTION

PATENT NO.  : 5,233,575
DATED       : August 3, 1993
INVENTOR(S) : Kenichi Uchino et al.

It is certified that error appears in the above-indentified patent and that said Letters Patent is hereby corrected as shown below:

On the Title page, Item [22] should be deleted and the PCT information should be added, please insert:

--[22]  PCT Filed:        Nov. 8, 1990
  [86]  PCT No.:          PCT/JP90/01454
        § 371 Date:       Jul. 26, 1991
        § 102(e) Date:    Jul. 26, 1991
  [87]  PCT Pub. No.:     WO91/07748
        PCT Pub. Date:    May 30, 1991--

Signed and Sealed this

Twelfth Day of April, 1994

Attest:

BRUCE LEHMAN

Attesting Officer

*Commissioner of Patents and Trademarks*